US012679367B2

(12) United States Patent
Lenaerts et al.

(10) Patent No.: US 12,679,367 B2
(45) Date of Patent: Jul. 14, 2026

(54) SYSTEM AND METHOD FOR VEHICLE HILL HOLD RELEASE

(71) Applicant: Dana Limited, Maumee, OH (US)

(72) Inventors: Nicolas Lenaerts, Bruges (BE); Stijn Goossens, Erpe-Mere (BE)

(73) Assignee: DANA LIMITED, Maumee, OH (US)

( * ) Notice: Subject to any disclaimer, the term of this patent is extended or adjusted under 35 U.S.C. 154(b) by 207 days.

(21) Appl. No.: 18/400,885

(22) Filed: Dec. 29, 2023

(65) Prior Publication Data

US 2025/0214587 A1     Jul. 3, 2025

(51) Int. Cl.
*B60W 30/18*          (2012.01)
*B60W 10/08*          (2006.01)

(52) U.S. Cl.
CPC ...... *B60W 30/18118* (2013.01); *B60W 10/08* (2013.01); *B60W 30/18027* (2013.01); *B60W 2710/021* (2013.01); *B60W 2710/083* (2013.01)

(58) Field of Classification Search
CPC .......... B60W 30/18118; B60W 10/08; B60W 30/18027; B60W 2710/021; B60W 2710/083
See application file for complete search history.

(56) References Cited

U.S. PATENT DOCUMENTS

| | | | |
|---|---|---|---|
| 8,998,771 B2 * | 4/2015 | Pietron | B60W 10/02 |
| | | | 903/946 |
| 10,518,773 B2 | 12/2019 | Xu et al. | |
| 2005/0064988 A1 * | 3/2005 | Hasegawa | F16H 61/20 |
| | | | 477/70 |
| 2020/0070836 A1 * | 3/2020 | Suzuki | B60L 15/20 |
| 2023/0074183 A1 | 3/2023 | Szeppat et al. | |
| 2023/0174043 A1 * | 6/2023 | Goossens | B60W 20/15 |
| | | | 701/50 |

* cited by examiner

*Primary Examiner* — Aniss Chad
*Assistant Examiner* — Christine Nguyen Huynh
(74) *Attorney, Agent, or Firm* — McCoy Russell LLP

(57) ABSTRACT

A method and system for releasing a vehicle from a hill hold mode is described. In one example, torque output of an electric machine is adjusted to reduce a possibility of the vehicle moving in an unintended direction prior to or during release of the vehicle from hill hold mode.

20 Claims, 8 Drawing Sheets

700

SYSTEM AND METHOD FOR VEHICLE HILL HOLD RELEASE

TECHNICAL FIELD

The present disclosure relates to controlling a vehicle that is being released from hill hold mode. The approach may be applied to hill hold systems that have different types of engagement mechanisms.

BACKGROUND AND SUMMARY

A vehicle may include a hill hold mode where the vehicle remains stationary after a vehicle that has come to a stop when the vehicle's human operator releases a vehicle brake pedal. The hill hold mode may give the vehicle's human operator a rest period while the waiting for conditions to change so that the vehicle may resume traveling. However, when the vehicle is released from hill hold mode, the vehicle may have a tendency to move in an unintended direction.

The inventors herein have recognized the above-mentioned issues and have developed a method for releasing a vehicle from a hill hold mode, comprising: via a controller, lowering a pressure of a fluid to disengage a vehicle motion restraining device; and adjusting an amount of torque output via an electric machine in response to the pressure and a friction coefficient of the vehicle motion restraining device in response to slip of the motion restraining device.

By adjusting torque output of an electric machine in response to a pressure delivered to a vehicle motion restraining device and a friction coefficient of the vehicle motion restraining device, it may be possible to provide the technical result of reducing or avoiding vehicle motion in an unintended direction. Specifically, torque output from the electric machine may overcome a force of gravity on a vehicle when the vehicle is stopped on an incline so that the vehicle moves forward rather than in reverse, for example. In some examples, the vehicle may maintain its position by applying vehicle brakes, while in other examples, the vehicle may maintain its position by locking a transmission output shaft to a transmission case via brakes or clutches. The torque of the electric machine may be applied before or while the brakes and/or transmission are being released so as to reduce vehicle movement.

The present description may provide several advantages. In particular, the approach may reduce a possibility of a vehicle moving in an unintended direction after exiting a hill hold mode. In addition, the approach may allow a vehicle to achieve a desired creep speed after exiting a hill hold mode. Further, the approach may allow the vehicle to avoid back and forth motion when being released from hill hold mode.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to constrain the scope of the present disclosure in any way.

DETAILED DESCRIPTION

Figure 1:
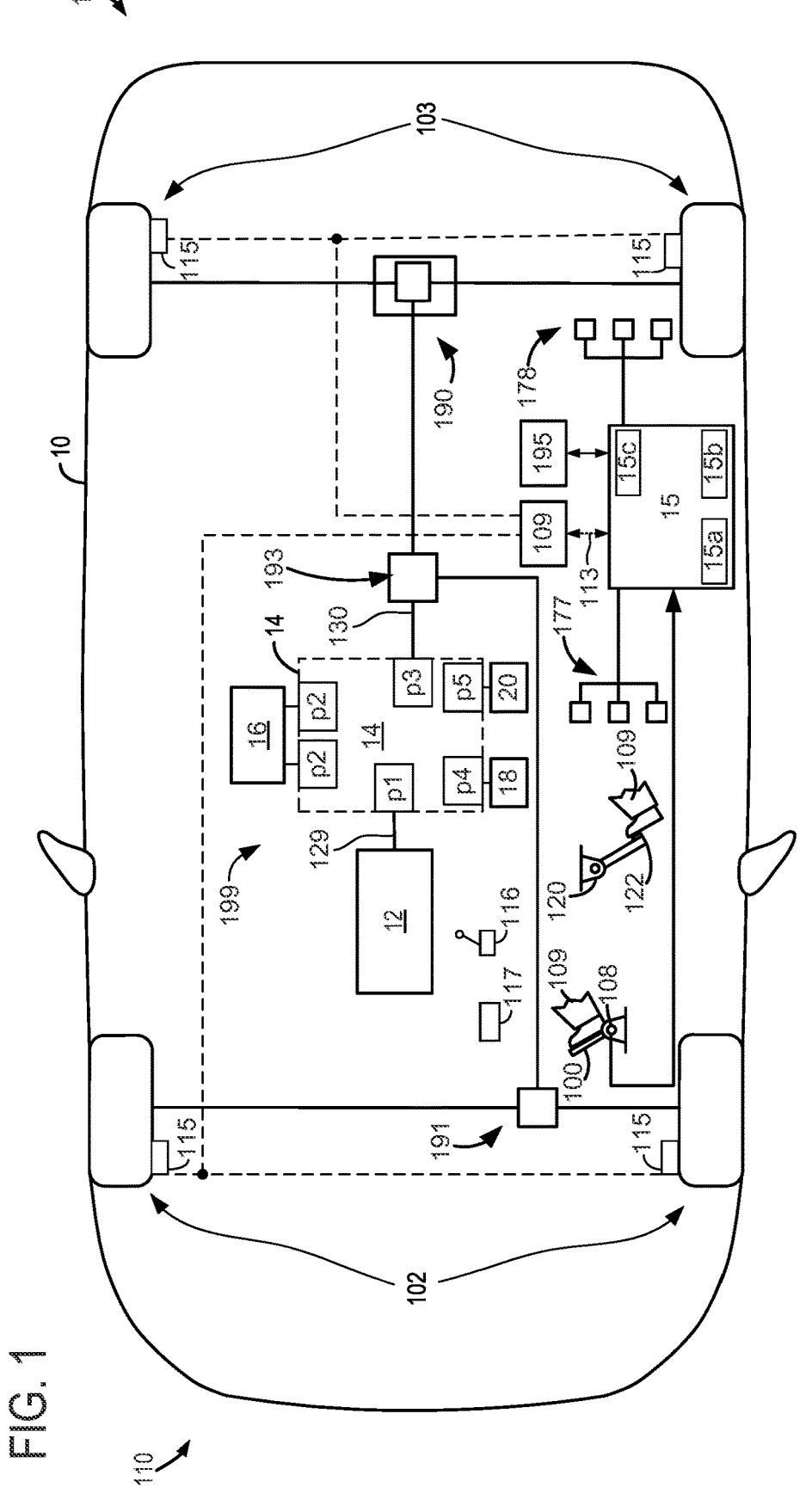
FIG. 1 is a schematic diagram of an example vehicle powertrain that includes a transmission.
Figure 2:
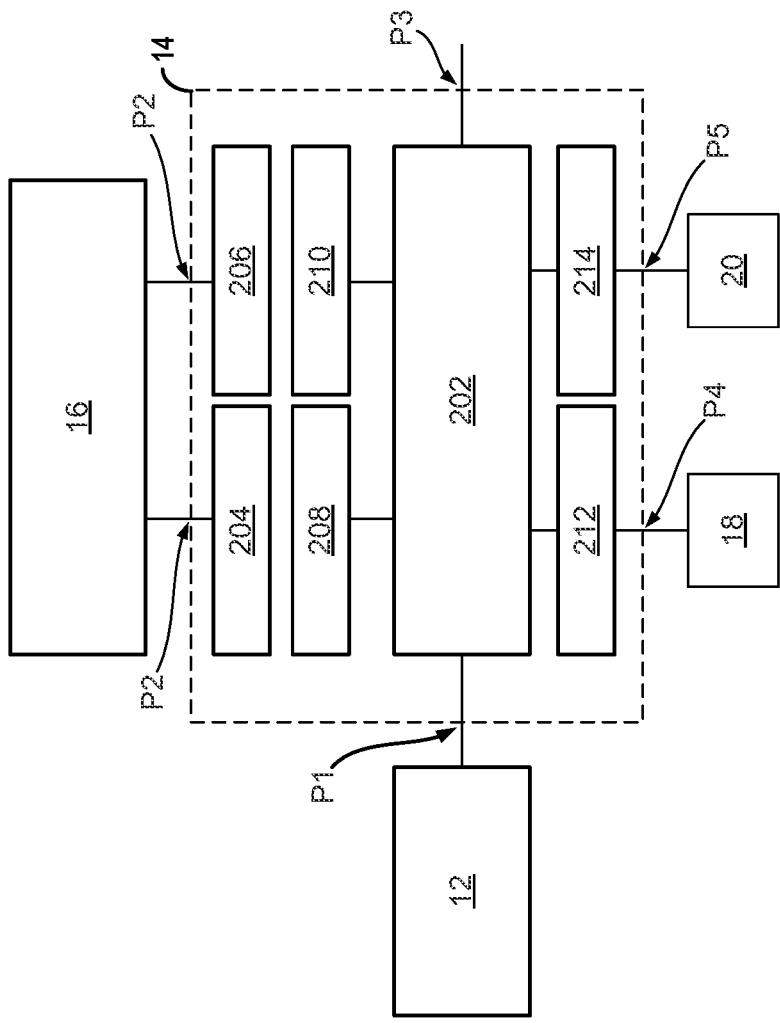
FIGS. 2-4 show diagrams of example transmissions.
Figure 3:
Figure 4:
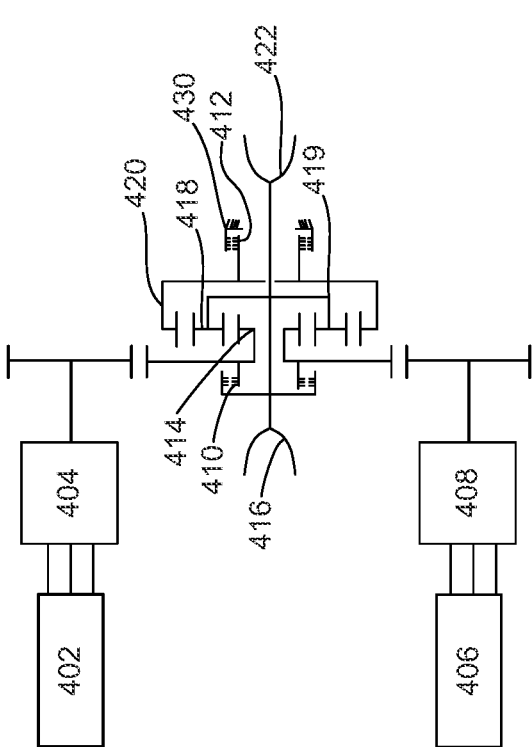
Figure 4:
Figure 5:
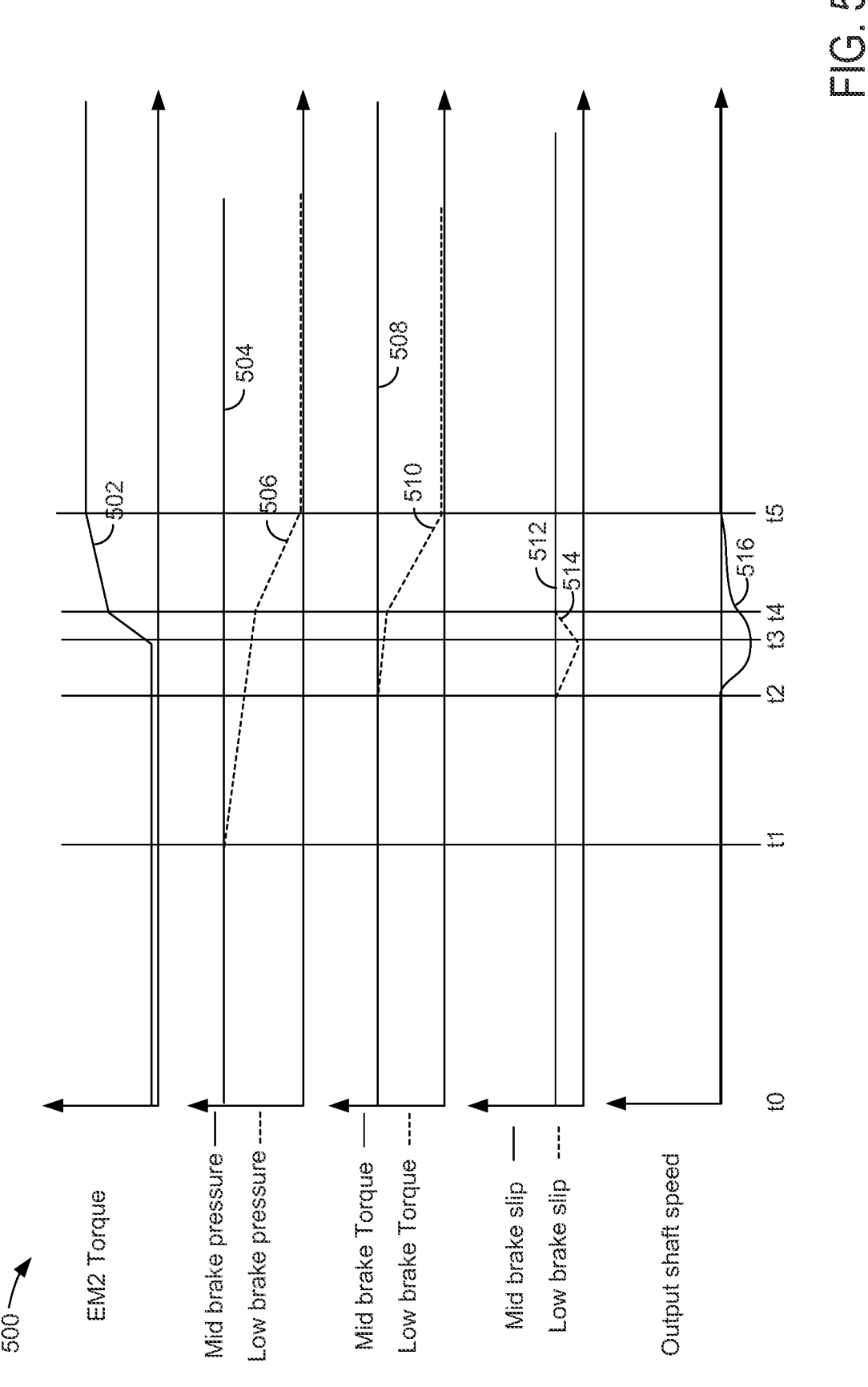
FIGS. 5 and 6 show operating sequences for the system of FIGS. 1-4 and the method of FIGS. 7 and 8.
Figure 6:

The following description relates to systems and methods for releasing a vehicle from a hill hold mode. The vehicle may include an electric machine that provides tractive effort for the vehicle. The vehicle may be an electric vehicle, a hybrid vehicle, or a vehicle that has an internal combustion engine as it sole motive power source. In one example, the vehicle may be a four-wheel drive vehicle as shown in FIG. 1. The vehicle may include a transmission that is configured as shown in FIGS. 2-4, or alternatively, the transmission may be of a different configuration. The vehicle may be operated as shown in FIGS. 5 and 6 to reduce a possibility of the vehicle moving in an unintended direction. The vehicle may be operated according to the method of FIGS. 7 and 8.

FIG. 1 illustrates an example vehicle powertrain 199 included in vehicle 10. Vehicle 10 includes a front side 110 and a rear side 111. Vehicle 10 includes front wheels 102 and rear wheels 103. Vehicle 10 includes a propulsion source 12 (e.g., internal combustion engine or electric machine) that may selectively provide propulsive effort to front axle 191 and rear axle 190. In other examples, the propulsion source 12 may provide propulsive effort solely to front axle 191 or solely to rear axle 190. Propulsion source 12 is shown mechanically coupled to transmission 14 via transmission input shaft 129. In some examples, the engine's crankshaft (not shown) may be coupled to transmission input shaft 129. Transfer case 193 routes mechanical power from transmission output shaft 130 to front axle 191 and rear axle 190. A vehicle operator may select a particular transmission gear or vehicle operating mode via shifter 116. The vehicle's angle relative to horizontal ground may be determined via inclinometer 117.

Electric energy storage device 16 (e.g., a traction battery or capacitor) may provide electric power to electric machines included in transmission 14. Transmission 14 may supply mechanical power to mechanically driven accessories 18 and 20. Transmission 14 may be operated via controller 15. In this example, controller 15 is configured to command electric machines (not shown), clutches (not shown), and brakes (not shown) within transmission 14. Controller 15 may switch operating modes of transmission 14 via adjusting states of clutches and brakes. Controller 15 may also receive a position of a driver demand pedal 100 from driver demand pedal position sensor 108, which may be an input for determining the operating state of transmission 14. The driver demand pedal 100 and the driver demand pedal position sensor 108 may react to movement caused by human driver 109. Brake pedal 122 may be applied by human driver 109 and brake pedal sensor 120 provides an indication of brake pedal position to controller 15. Controller 15 may receive data from sensors 177. Sensors 177 may include, but are not constrained to a vehicle speed sensor, a transmission temperature sensor, transmission input shaft speed sensor, transmission output shaft speed sensor, wheel speed sensors, an inclinometer, and a shifter position sensor, and an ambient temperature sensor. Controller 15 may adjust operating states of the vehicle powertrain 199 via adjusting operating states of actuators 178. Actuators 178 may include but are not constrained to electric machines, inverters, clutches (C0-C2), brakes (mid brake B1/low brake B2), and engine torque actuators (throttle, cams, fuel injectors, spark actuator). Controller 15 includes a processor 15*a* for executing instructions, read-exclusive memory 15*b*, and random access memory 15*c*. In this example, a single controller 15 is shown, but in other examples several controllers may operate together in a distributed system to perform the methods described herein. Controller 15 may receive input from and provide output to human/machine interface 195 (e.g., touch screen display, pushbuttons, etc.). Controller 15 may also communicate with friction brake controller 109 via controller area network 113. Friction brake controller 109 may selectively apply and release friction brakes 115 in coordination with instructions received from controller 15. Alternatively, additional or fewer controllers may be provided.

Referring now to FIG. 2, a block diagram of transmission 14 is shown. Transmission 14 is shown with 5 ports that are labeled P1-P5. Port 1 (P1) is configured to receive mechanical energy from propulsion source 12 (e.g., internal combustion engine or electric machine). Alternatively, port 1 may deliver mechanical energy to external power source 12. Port 2 (P2) is a port that receives electrical power from electric energy storage device 16. Alternatively, port 2 may provide electrical power to electric energy storage device 1. Electrical ports 2 are shown directly electrically coupled to a first inverter 206 and a second inverter 204. First inverter 206 may convert direct current (DC) to alternating current (AC). AC may be delivered from first inverter 206 to first electric machine 210. Likewise, AC may be delivered from second inverter 204 to second electric machine 208. Alternatively, first and second electric machines 210 and 208 may deliver AC power to inverters 206 and 204. Electric machines 210 and 208 may supply mechanical power to gears, clutches, and brakes 202. As such, electric machines 210 and 208 may also be referred to as propulsion sources. Gears, clutches, and brakes 202 may transfer mechanical power to output ports P3-P5. Output port P3 may transfer mechanical power to wheels 103. Output port P4 may transfer mechanical power to power take off (PTO 1) 212 and accessories 18, the accessories 18 not including vehicle wheels. Output port P5 may transfer mechanical power to power take off (PTO 2) 214 and accessories 20, the accessories 20 not including vehicle wheels.

Turning now to FIG. 3, a detailed view of one example of transmission 14 is shown. In this example, propulsion source 12 is shown coupled to transmission input shaft 129. Transmission input shaft 129 is coupled to clutch C0 and clutch C0 may selectively couple transmission input shaft 129 to connecting shaft 304. Clutch C0 is directly coupled to ring gear 326 of first planetary gear set PT1 and PTO 1 gear 360 via connecting shaft 304. PTO 1 gear 360 may be coupled to accessories 18 via PTO 1 shaft 362. First planetary gear set PT1 also includes planetary gears 316 and a sun gear 322. Sun gear 322 is shown coupled to PTO 2 gear 340 and electric machine 210. Planetary gears 316 couple sun gear 322 to ring gear 326. Carrier 328 supports planetary gears 316. PTO 2 gear 340 may be selectively coupled to PTO 2 output shaft 342 via PTO 2 clutch C2. PTO 2 output shaft 342 may be directly coupled to accessories 20, and accessories 20 are not coupled to vehicle wheels.

Connecting shaft 304 may be selectively coupled to electric machine 208 and sun gear 306 of third planetary gear set PT3 via closing input coupled clutch C1. Sun gear 306 of third planetary gear set PT3 is coupled to planetary gears 308. Planetary gears 308 are coupled to ring gear 310, and planetary gears 308 are supported via carrier 312. Planetary gears 308 are coupled to ring gear 318 of second planetary gear set PT2 and planetary gears 316 of first planetary gear set PT1 via carrier 312 of third planetary gear set PT3 and carrier 328 of first planetary gear set PT1. Carrier 328 of first planetary gear set PT1 is coupled to wheels 103 via transmission output shaft 130. Mid brake B1 may be closed to ground or couple ring gear 310 of third planetary gear set PT3 to transmission case 399.

Second planetary gear set PT2 includes a sun gear 314 that is coupled to ring gear 310 of first planetary gear set PT1. Planetary gears 308 of second planetary gear set PT2 are coupled to sun gear 314 of planetary gear set PT2 and ring gear 318 of second planetary gear set PT2. Brake B2 may be closed to ground or couple carrier 320 of second planetary gear set PT2 to transmission case 399.

PTO 1 is directly coupled to connecting shaft 304. Therefore, whenever connecting shaft 304 is rotating, PTO 1 output shaft 362 rotates. PTO 1 output shaft 362 may be rotated via closing clutch C0 when propulsion source 12 is rotating. PTO 1 may also be rotated via electric machine 208 by closing clutch C1. PTO 1 may rotate in any of the modes that are shown in the table of FIG. 4.

PTO 2 may rotate and provide mechanical power to accessories 20 during three modes. In a hill hold mode, brakes mid brake B1 and low brake B2 may be closed to lock rotation of transmission output shaft 130 and PTO 2 output shaft 342 may be rotated via torque generated via electric machine 210 and/or propulsion source 12. In this way, PTO 2 output shaft 342 may rotate at a speed that is a multiple of a rotational speed of propulsion source 12 and connecting shaft 304.

PTO 2 output shaft 342 may be rotated when clutch C1 is open, C2 is closed, and C0 is open or closed. PTO 2 output shaft 342 may also provide mechanical torque to accessories 20 when brake mid brake B1 is open, low brake B2 is closed, C1 is open, C2 is closed and C0 is open or closed. Applying brake B2 prevents rotation of carrier 320 so that when propulsion source 12 or electric machine 208 drive the transmission output shaft 130 via connecting shaft 304, second planetary gear set PT2, and first planetary gear set PT1, PTO 2 gear 340 may rotate. Energy may flow from propulsion source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO 2 gear 340 to rotate. PTO2 output shaft 342 may rotate when clutch C2 is closed.

PTO 2 output shaft 342 may also be rotated when clutch C1 is open, C2 is closed, and C0 is open or closed. PTO 2 output shaft 342 may also provide mechanical torque to accessories 20 when brake mid brake B1 is closed, low brake B2 is open, C1 is open, C2 is closed and C0 is open or closed. Applying brake mid brake B1 prevents rotation of ring gear 310 and sun gear 306. Energy may flow from propulsion source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO 2 gear 340 to rotate. PTO2 output shaft 342 may rotate when clutch C2 is closed.

Referring now to FIG. 4, one of several alternative transmission configurations that may benefit from the method disclosed herein is shown. Transmission 400 includes a first inverter 402 and a second inverter 406. First inverter 402 is directly electrically coupled to first electric machine 404. Second inverter 406 is directly electrically coupled to second electric machine 408. First electric machine 404 and second electric machine 408 may be powered by electric energy storage device 16 as shown in FIG. 1. In this example, controller 15 (e.g., as shown in FIG. 1) is configured to command first electric machine 404, second electric machine 408, a first clutch 410, and a first brake 412. The controller may switch operating modes of transmission 400 via adjusting states of clutches and brakes.

Transmission 400 includes a rear output shaft 416 and a front output shaft 422. Transmission also includes a planetary gear set 413 that includes a sun gear 414, planetary gears 418, carrier 419 that supports the planetary gears, and ring gear 420. First brake 412 may selectively couple ring gear 420 to transmission case 430. Rear output shaft 416 and front output shaft 422 are coupled to carrier 419 and first clutch 410. First clutch 410 may be closed to couple front output shaft 416 and rear output shaft 422 to sun gear 414, first electric machine 404 and second electric machine 408. Output shaft 422 and input shaft 416 may be locked by applying clutch 410 and first brake 412.

Thus, the systems of FIGS. 1-4 may provide for a vehicle hill hold system, comprising: a transmission of a vehicle including one or more brakes that are operable to couple an output shaft of the transmission to a case of the transmission; an electric machine configured to provide propulsive effort to the vehicle; a controller including executable instructions that cause the controller to adjust a torque output of the electric machine in response to an indication of slip of the one or more brakes that are operable to couple the output shaft of the transmission to the case of the transmission. In a first example, the vehicle hill hold system further comprises additional executable instructions to adjust the torque output of the electric machine in response to a request to release a hill hold mode from being engaged. In a second example that may include the first example, the vehicle hill hold system includes where the hill hold mode includes applying the one or more brakes to couple the output shaft of the transmission to the case of the transmission. In a third example that may include one or both of the first and second examples, the vehicle hill hold system includes where the torque output of the electric machine is adjusted based on a friction coefficient of a brake included in the one or more brakes and a pressure of fluid supplied to the one or more brakes. In a fourth example that may include one or more of the first through third examples, the vehicle hill hold system further comprises additional instructions that cause the controller to reduce a pressure applied to the one or more brakes in response to a request to release a hill hold mode from being engaged. In a fifth example that may include one or more of the first through fourth examples, the vehicle hill hold system includes where the torque output of the electric machine is adjusted to a torque that moves the vehicle in a forward direction when the one or more brakes are released and the driver demand pedal is not applied.

In another representation, the system of FIGS. 1-4 may provide for a vehicle hill hold system, comprising: a transmission of a vehicle including one or more clutches that are operable to lock an output shaft of the transmission so as to prevent motion of the output shaft; an electric machine configured to provide propulsive effort to the vehicle; a controller including executable instructions that cause the controller to adjust a torque output of the electric machine in response to an indication of slip of the one or more clutches that are operable to lock the output shaft of the transmission. For example, two or more gear clutches may be simultaneously engaged to lock a transmission output shaft.

Figure 7:
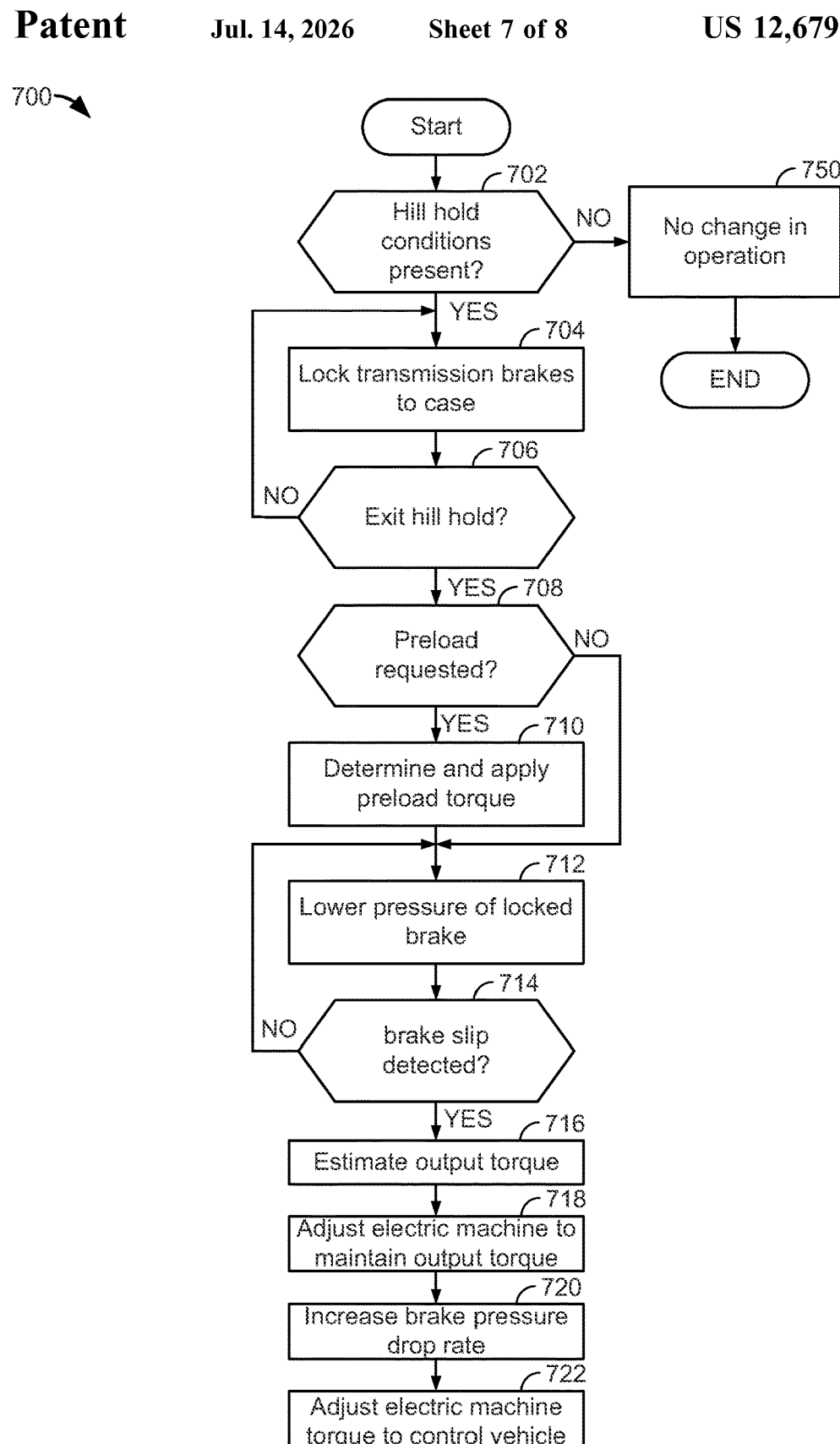
FIGS. 7 and 8 show method for operating a vehicle that has a hill hold mode.
Figure 8:
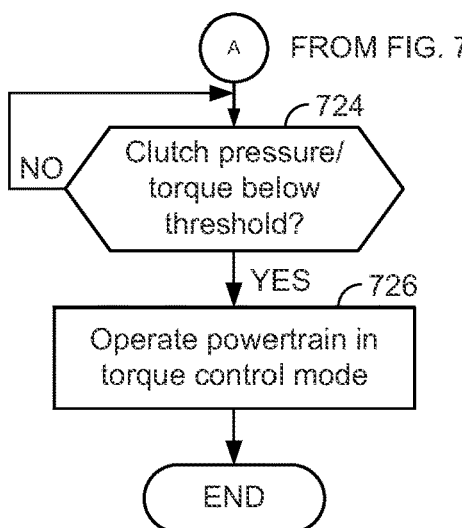

Referring now to FIG. 5, a hill hold mode release sequence according to the method of FIGS. 7 and 8 is shown. The sequence of FIG. 5 may be provided by the systems of FIGS. 1-4 in cooperation with the method of FIGS. 7 and 8. The plots of FIG. 5 are time aligned.

The first plot from the top of FIG. 5 is a plot of torque output of second electric machine 208 of FIG. 2 versus time. The vertical axis represents torque and the torque value increases in the direction of the vertical axis arrow. The horizontal axis represents time and time increases from the left side of the figure to the right side of the figure. Trace 502 represents torque output of the second electric machine.

The second plot from the top of FIG. 5 is a plot of pressure that is applied to transmission brakes. The vertical axis represents brake pressure and the brake pressure value increases in the direction of the vertical axis arrow. The horizontal axis represents time and time increases from the left side of the figure to the right side of the figure. Trace 504 represents mid brake pressure. Trace 506 represents low brake pressure.

The third plot from the top of FIG. 5 is a plot of torque transferred via transmission brakes. The vertical axis represents brake torque transferred and the brake torque value increases in the direction of the vertical axis arrow. The horizontal axis represents time and time increases from the left side of the figure to the right side of the figure. Trace 508 represents mid brake torque. Trace 510 represents low brake torque.

The fourth plot from the top of FIG. 5 is a plot of slip of transmission brakes (e.g., for the transmission of FIG. 3, brake slip=$w_r$=$((1+R)*w_c-w_s)/R$, with $w_c$=output shaft speed, and $w_s$=EM2 shaft speed (e.g., 208 of FIG. 2), and R=mid planetary gear set ring to sun speed ratio) versus time. The vertical axis represents brake slip and the brake slip value increases in the direction of the vertical axis arrow. The horizontal axis represents time and time increases from the left side of the figure to the right side of the figure. Trace 512 represents mid brake slip. Trace 514 represents low brake slip.

The fifth plot from the top of FIG. 5 is a plot of transmission output shaft speed versus time. The vertical axis represents transmission output shaft speed. Transmission output shaft speed increases in a direction of the vertical axis arrow for forward vehicle travel, and output shaft speed increases in a direction below and away from the horizontal axis for reverse vehicle travel. The horizontal axis represents time and time increases from the left side of the figure to the right side of the figure. Output shaft speed at the level of the horizontal axis is zero. Trace 516 represents transmission output shaft speed.

At time t0, the torque output of the second electric machine is low and the mid and low brake pressures are high. The mid and low brake torque transfer amounts are high and the mid and low brake slip levels are low. The transmission output shaft speed is zero.

At time t1, a request to unlock the transmission is generated and pressure to the low brake is reduced. The mid and low brake torque transfer amounts remain high and the mid and low brake slip remains unchanged. The torque output of the second electric machine is unchanged. The transmission output shaft speed is zero.

At time t2, the low brake torque transfer amount is reduced to a level where the low brake slip becomes non-zero, thereby indicating that the present brake torque is equal to the brake torque capacity of the slipping brake. Since the brake is slipping the torque transfer amount of the brake may be determined. The torque transfer amount of the brake at this time is the basis for adjusting the torque output of the second electric machine at time t3. The mid brake torque transfer amount and mid brake slip remain unchanged. The torque output of the second electric machine is unchanged. The transmission output shaft speed begins to indicate reverse direction movement of the vehicle.

At time t3, the torque output of the second electric machine is increased according to the torque transfer amount of the low brake at time t2. Adjusting the torque output of the second electric machine allows the torque output of the second electric machine to compensate for some of the force of gravity that tends to move the vehicle in a reverse direction in this example. The powertrain also changes from a torque control mode where torque output of the powertrain is adjusted to follow a requested torque and where vehicle speed is permitted to change to a speed control mode where vehicle speed is controlled to a requested speed (e.g., zero speed) and torque of the powertrain (e.g., torque of the second electric machine) is adjusted so that the vehicle achieves the requested vehicle speed. The low brake pressure begins to be reduced at a higher rate and the low brake torque transfer amount also begins to decline at a higher rate. The low brake slip begins to increase from a minimum level. The mid brake pressure, mid brake torque transfer amount, and mid brake slip are unchanged. The amount of time between t2 and t3 is the amount of time delay it takes the controller to react to the indication of slip to making the torque adjustment via the electric machine. The transmission output shaft speed has increased in the reverse direction.

At time t4, the initial brake slip has been compensated and the powertrain remains in speed control mode. The torque output of the second electric machine gradually changes to a threshold level to counteract the force gravity imparts on the vehicle to move the vehicle in a downhill direction and the reduction in the torque transfer amount of the low brake. The transmission output shaft speed is decreasing due to the electric machine torque increase.

At time t5, the torque output of the second electric machine is sufficient to overcome the torque that gravity applies to move the vehicle in a downhill direction so that the vehicle speed is zero when the lower brake is fully released. This allows the powertrain to change from a vehicle speed control mode to a torque control mode where driver demand torque plus the torque that allowed the vehicle speed to be zero at time t5 is commanded of the powertrain.

In this way, torque transfer amount of a brake or clutch may be a basis for commanding output of an electric machine so that movement of the vehicle in an unintended direction may be reduced when a vehicle exits a hill hold mode. The electric machine torque compensates for the loss of torque transfer amount of the brake or clutch that is being released so that vehicle motion may be reduced.

Referring now to FIG. 6, a second hill hold mode release sequence according to the method of FIGS. 7 and 8 is shown. The sequence of FIG. 6 may be provided by the systems of FIGS. 1-4 in cooperation with the method of FIGS. 7 and 8. The plots of FIG. 6 are time aligned.

The first plot from the top of FIG. 6 is a plot of torque output of second electric machine 208 of FIG. 2 versus time. The vertical axis represents torque and the torque value increases in the direction of the vertical axis arrow. The horizontal axis represents time and time increases from the left side of the figure to the right side of the figure. Trace 602 represents torque output of the second electric machine.

The second plot from the top of FIG. 6 is a plot of pressure that is applied to transmission brakes. The vertical axis represents brake pressure and the brake pressure value increases in the direction of the vertical axis arrow. The horizontal axis represents time and time increases from the left side of the figure to the right side of the figure. Trace 604 represents mid brake pressure. Trace 606 represents low brake pressure.

The third plot from the top of FIG. 6 is a plot of torque transferred via transmission brakes (e.g., an amount of torque that the transmission brake may transfer). The vertical axis represents brake torque transferred and the brake torque value increases in the direction of the vertical axis arrow. The horizontal axis represents time and time increases from the left side of the figure to the right side of the figure. Trace 608 represents mid brake torque. Trace 610 represents low brake torque.

The fourth plot from the top of FIG. 6 is a plot of slip of transmission brakes versus time. The vertical axis represents brake slip and the brake slip value increases in the direction of the vertical axis arrow. The horizontal axis represents time and time increases from the left side of the figure to the right side of the figure. Trace 612 represents mid brake slip. Trace 614 represents low brake slip. The sequence of FIG. 6 may be generated via the system of FIGS. 1-4 in cooperation with the method of FIGS. 7 and 8.

The fifth plot from the top of FIG. 6 is a plot of transmission output shaft speed versus time. The vertical axis represents transmission output shaft speed. Transmission output shaft speed increases in a direction of the vertical axis arrow for forward vehicle travel, and output shaft speed increases in a direction below and away from the horizontal axis for reverse vehicle travel. The horizontal axis represents time and time increases from the left side of the figure to the right side of the figure. Output shaft speed at the level of the horizontal axis is zero. Trace 616 represents transmission output shaft speed.

At time t10, the torque output of the second electric machine is low and the mid and low brake pressures are high. The mid and low brake pressures are unchanged. The mid and low brake torque transfer amounts are high and the mid and low brake slip levels are low. The transmission output shaft speed is zero.

At time t11, a request to unlock the transmission is generated. In this example, the torque output from the second electric machine is increased to a predetermined level in response to the request to unlock the transmission so that the vehicle may not roll in an unintended direction. The torque transferred via the low and mid brakes decreases since the electric machine torque counteracts the torque that is due to gravity on the vehicle. The mid and low brake pressures are unchanged and the mid and low brake slip amounts are low. The transmission output shaft speed is zero.

At time t12, the low brake pressure begins to be reduced. The mid brake pressure is unchanged to a level and the mid brake torque transferred and the low brake torque transferred have leveled off to a low constant value. The mid brake slip and the low brake slip remain unchanged. The transmission output shaft speed is zero.

At time t13, the low brake pressure is reduced to a level that allows the torque from the second electric machine to move the vehicle in a forward direction, thereby increasing low brake slip. The vehicle is changed from torque control mode to speed control mode in response to slip being detected. The second electric machine torque output is unchanged and the mid brake pressure is unchanged. The mid brake torque transferred is unchanged and the mid brake slip is unchanged. The torque transfer amount of the low brake may be determined at this time. The low brake torque transferred is also unchanged. The transmission output shaft speed begins to increase in the forward vehicle direction.

At time t14, the torque output of the second electric machine is reduced in response to the amount of torque that is transferred by the low brake when the low brake started slipping at time t13. The lowered second electric machine torque causes the mid brake torque transferred and the low brake torque transferred amounts to increase. The low brake pressure continues to be reduced and the mid brake pressure is unchanged. The low brake slip is reduced as the torque output of the second electric machine is increased. The mid brake slip is unchanged. The transmission output shaft speed peaks in the forward direction.

At time t15, the vehicle speed reaches its target or requested speed of zero. The slip of the low clutch is reduced to zero. The torque output of the second electric machine gradually changes to a threshold level to counteract the force gravity imparts on the vehicle to move the vehicle in a downhill direction and the reduction in the torque transfer amount of the low brake. The transmission output shaft speed begins to increase in the forward vehicle direction. The transmission output shaft speed returns to zero.

At time t16, the torque output of the second electric machine is sufficient to overcome the torque that gravity applies to move the vehicle in a downhill direction so that the vehicle speed is zero when the lower brake is fully released. This allows the powertrain to change from a vehicle speed control mode to a torque control mode where driver demand torque plus the torque that allowed the vehicle speed to be zero at time t16 is commanded of the powertrain. The low brake slip is equal to zero and the mid brake pressure is unchanged. The torque transferred by the mid brake torque is unchanged. The mid brake pressure, mid brake torque transferred, and mid brake slip are unchanged.

In this way, the torque transfer amount of the second electric machine may be increased so that the possibility of rolling in an unintended direction may be reduced. The torque transfer amount of a brake or clutch may be a basis for commanding output of an electric machine once the low clutch begins to slip so that movement of the vehicle in the unintended direction may be reduced when a vehicle exits a hill hold mode. The second electric machine torque compensates for the loss of torque transfer amount of the brake or clutch that is being released so that vehicle motion may be reduced.

Referring now to FIGS. 7 and 8, a method for operating a vehicle in a hill hold mode and releasing the vehicle from hill hold mode is shown. The method of FIGS. 7 and 8 may be stored as executable instructions in non-transitory memory of a controller of a system as described in FIGS. 1-4. The controller may apply sensors and actuators to adjust operating states of the system according to the method of FIGS. 7 and 8.

Method 700 is described in terms of applying clutches, but brakes (e.g., wheel friction brakes or transmission brakes) may be applied in some embodiments instead of clutches. As such, actions of brakes may be substituted for actions of clutches. For example, one vehicle may enter hill hold mode by locking a transmission by applying two or more transmission clutches or two or more transmission brakes. Another vehicle may enter hill hold mode by applying two or more friction wheel brakes. The one vehicle may exit the hill hold mode by opening one transmission clutch or one transmission brake. The other vehicle may exit the hill hold mode by releasing the two or more friction wheel brakes. Thus, the approach is not constrained to one particular type of actuator to constrain vehicle motion while in hill hold mode.

At 702, method 700 judges whether or not conditions are present for entering the vehicle in a hill hold mode. The hill hold mode may comprise closing brakes or clutches to lock an output shaft of a transmission, or alternatively, wheels of a vehicle so as to reduce a possibility of vehicle motion. In one example, hill hold mode may be entered when vehicle speed is less than a threshold and vehicle angle is greater than a threshold. The vehicle angle may be determined via an inclinometer or accelerometer. In other examples, other conditions may be a basis for entering hill hold mode. If method 700 judges that conditions to enter hill hold mode are present, the answer is yes and method 700 proceeds to 704. Otherwise, the answer is no and method 700 proceeds to 750.

At 750, method 700 performs no change in vehicle operating mode. Thus, it the vehicle is traveling in a forward direction, the vehicle continues to travel in the forward direction. Method 700 proceeds to exit.

At 704, method 700 locks a transmission output shaft. The transmission output shaft may be locked via closing one or more transmission brakes or one or more transmission clutches (e.g., vehicle motion restraining devices since their engagement locks the transmission output shaft). Alternatively, a possibility of vehicle motion may be reduced by locking two or more vehicle wheels via closing friction brakes. Locking the transmission output shaft or vehicle brakes may constrain vehicle motion when a vehicle is stopped on an incline. Method 700 proceeds to 706.

At 706, method 700 judges whether or not conditions are present to exit or release hill hold mode. If so, the answer is yes and method 700 proceeds to 708. If not, the answer is no and method 700 returns to 704. Conditions to exit hill hold mode may include but are not constrained to an increase in driver demand torque or a change in a position of a shift lever.

At 708, method 700 judges whether or not a preload for exiting hill hold mode has been requested. A preload may increase a torque output of an electric machine to counteract or overcome the force of gravity on a vehicle to roll the vehicle downhill. In some examples, a user may specifically request a preload, or alternatively, a vehicle controller may set a preload amount as a default condition. The preload may not be requested during some conditions, such as if battery state of charge is low. If method 700 judges that a preload is requested, the answer is ye sand method 700 proceeds to 710. Otherwise, the answer is no and method 700 proceeds to 712.

At 710, method 700 command a traction motor or electric machine to output a predetermined amount of torque. In one example, method 700 may retrieve a value from controller memory and command electric machine torque to the value. In some examples, method 700 may determine a torque value to command the electric machine to that is based on vehicle mass and vehicle angle. The torque value may be determined via referencing a table or function via vehicle mass and vehicle angle. Method 700 command the electric machine to a predetermined torque value that is expected to move the vehicle in a forward direction. The vehicle powertrain is operated in a torque control mode where vehicle speed is permitted to change and powertrain torque is commanded to a requested value. Method 700 proceeds to 712.

At 712, method 700 begins lowering a force (e.g., a pressure of a fluid, electric current, or magnetic force, mechanical force, etc.) that is applied to operate a brake or clutch. The brake may be a transmission brake or a wheel friction brake. For example, the brake may be the low brake of the transmission shown in FIG. 3. The clutch may be a transmission clutch. By lowing the pressure of the brake or clutch, the torque transfer capacity of the brake or clutch may be reduced. Method 700 proceeds to 714.

At 714, method 700 judges whether or not clutch or brake slip is detected. In one example, for the transmission shown in FIG. 3, brake slip may be determined by the following equation:

$$MBslip = wr = \frac{((1 + R) \cdot wc - ws)}{R}$$

where MBslip is mid brake slip, wc=transmission output shaft speed, ws=EM2 shaft speed, and R=mid planetary gear set ring to sun speed ratio. If method 700 judges that clutch or brake slip magnitude is greater than a threshold amount, the answer is yes and method 700 proceeds to 716. Otherwise, the answer is no and method 700 returns to 712.

At 716, method 700 estimates output torque for an electric machine that compensates for torque capacity of a clutch or brake that is being opened to release the vehicle from hill hold mode. The amount of torque may be a function of the clutch/brake that is opened and the gear that is engaged. For example, for the transmission of FIG. 3 opening the low brake, when going from hill hold to mid gear: by opening the low brake, at the point that the low brake starts to slip the brake's torque equals its torque capacity (e.g., the amount of torque that the brake may transfer). In particular, method 700 determines or measures a clutch or brake pressure (Plow) and looks up the brake's or clutch's friction coefficient (μlow) and pressure to torque ratio (p2Trqlow) in controller memory, to estimate clutch or brake torque via the following equation:

$$Tlow = Plow \cdot p2Trqlow$$

or $$Tlow = Plow \cdot \mu low \cdot Alow \cdot ReqLow$$

where Tlow is the clutch or brake torque, Plow is the clutch or brake pressure, and plow is the clutch or brake coefficient of friction. The pressure to torque ratio may be a function of the coefficient of friction, differential clutch/brake speed, etc. The mechanical equation of the powertrain in mid gear with the low clutch/brake torque known and with an extra torque on the low clutch, can be solved via the following equation:

$$Tout = TEM2 \cdot (1 + Rm) + \frac{Tlow \cdot R1}{1 + R1}$$

where TEM2 is torque of the second electric machine, Tout is the transmission output torque, Rm is the mid planetary gear set ring to sun ratio output torque, R1 the low planetary gear set ring to sun ratio. Note that for brevity, the torque via the power split planetary gear is omitted, which may be added to the above equation. Similarly, if the mid gear brake is opened for launching in low gear, the transmission output torque may be solved for the transmission of FIG. 3 via the following equation:

$$Tout = TEM2 \cdot ((1 + Rm) + (Rm \cdot R1)) + Tmid \cdot R1$$

where Tout, TEM2, Rm, and R1 are as previously described and Tmid is the mid clutch/brake torque. Method 700 proceeds to 718 after the transmission torque output is determined.

At 718, method 700 commands the torque of an electric machine (e.g., the second electric machine of FIG. 3) to produce the transmission output torque determined at 716. For example, the electric machine torque may be the transmission output torque divided by the gear ratio between the transmission output shaft and the electric machine. Method 700 proceeds to 720.

At 720, method 700 increases the rate of brake or clutch pressure drop. The brake or clutch pressure drop is increased to lower the amount of time that it takes to release the hill hold mode. Method 700 proceeds to 722.

At 722, method 700 operates the powertrain in a speed control mode where torque of an electric machine is adjusted so that vehicle speed matches a requested or target vehicle speed of zero. Thus, the powertrain torque is adjusted and varied so that vehicle speed matches the target vehicle speed. Method 700 proceeds to 724.

At 724, method 700 judges whether or not pressure of a fluid that is supplied to operate the clutch or brake (e.g., clutch/brake pressure) is less than a threshold pressure. If so, the answer is yes and method 700 proceeds to 726. Otherwise, the answer is no and method 700 returns to 724.

At 726, method 700 operates the powertrain in a torque control mode. In particular, the powertrain is operated at the torque that allowed the vehicle to achieve zero speed plus driver demand torque. Once the driver demand pedal is at least partially released, the powertrain may be operated to provide solely the requested driver demand torque. Method 700 proceeds to exit.

In this way, method 700 may provide a preload torque before adjusting electric machine torque in response to clutch/brake torque when the clutch/brake begins to slip. Or alternatively, method 700 may not provide the preload torque and adjust electric machine torque in response to clutch/brake torque when the clutch/brake begins to slip.

The method of FIGS. 7 and 8 provide for a method for releasing a vehicle from a hill hold mode, comprising: via a controller, lowering a force to disengage a vehicle motion restraining device; and adjusting an amount of torque output via an electric machine in response to the pressure and a friction coefficient of the vehicle motion restraining device in response to slip of the motion restraining device. In a first example, the method includes where the vehicle motion restraining device is a friction brake. In a second example that may include the first example, the method includes where the vehicle motion restraining device is a transmission clutch. In a third example that may include one or both of the first and second examples, the method further comprises locking a transmission output shaft to engage the vehicle in the hill hold mode prior to disengaging the hill hold mode. In a fourth example that may include one or more of the first through third examples, the method includes where the transmission output shaft is locked via applying one or more transmission clutches. In a fifth example that may include one or more of the first through fourth examples, the method includes where the pressure is lowered in response to an increase in driver demand. In a sixth example that may include one or more of the first through fifth examples, the method includes where the pressure is lowered in response to an adjustment of a shifter. In a seventh example that may include one or more of the first through sixth examples, the method includes where the amount of torque is a constant. In an eighth example that may include one or more of the first through seventh examples, the method includes where the amount of torque is a function of road grade.

The method of FIGS. 7 and 8 also provides for a method for releasing a vehicle from a hill hold mode, comprising: via a controller, lowering a pressure of a transmission clutch to unlock an output shaft of a transmission from a transmission case in response to a request to exit a hill hold mode; and adjusting an amount of torque output via an electric machine in response to the request to exit the hill hold mode. In a first example, the method includes where adjusting the amount of torque output includes adjusting the torque output to a constant value. In a second example that may include the first example, the method includes where the constant value is based on output of an inclinometer. In a third example that may include one or both of the first and second examples, the method further comprises operating the vehicle in a speed control mode in response to slip of the transmission clutch. In a fourth example that may include one or more of the first through third examples, the method includes where the transmission clutch is one of two transmission clutches capable of unlocking the output shaft of the transmission.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a constrained sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for releasing a vehicle from a hill hold mode, comprising:
   via a controller, disengaging a vehicle motion restraining device;
   in response to detection of a slip of the vehicle motion restraining device, estimating an amount of torque output via an electric machine based on a current pressure of the vehicle motion restraining device and a friction coefficient of the vehicle motion restraining device; and
   adjusting the electric machine to produce the estimated amount of torque output.

2. The method of claim 1, where the vehicle motion restraining device is a friction brake.

3. The method of claim 1, where the vehicle motion restraining device is a transmission clutch.

4. The method of claim 1, further comprising locking a transmission output shaft to engage the vehicle in the hill hold mode prior to disengaging the hill hold mode.

5. The method of claim 4, where the transmission output shaft is locked via applying one or more transmission clutches.

6. The method of claim 1, where the pressure is lowered in response to an increase in depression of a driver demand pedal.

7. The method of claim 1, where the pressure is lowered in response to an adjustment of a shifter.

8. The method of claim 1, where the amount of torque is a constant.

9. The method of claim 1, where the amount of torque is a function of road grade.

10. A vehicle hill hold system, comprising:
    a transmission of a vehicle including one or more brakes that are operable to couple an output shaft of the transmission to a case of the transmission;
    an electric machine configured to provide propulsive effort to the vehicle; and
    a controller including executable instructions that cause the controller to:
    disengage one or more brakes that operable to couple the output shaft of the transmission to the case of the transmission;

in response to detection of a slip of the vehicle motion restraining device, estimate an amount of torque output via an electric machine based on a current pressure of the one or more brakes and a friction coefficient of the one or more brakes; and adjust the electric machine to produce the estimated amount of torque output.

11. The vehicle hill hold system of claim 10, further comprising additional executable instructions to adjust the torque output of the electric machine in response to a request to release a hill hold mode from being engaged.

12. The vehicle hill hold system of claim 11, where the hill hold mode includes applying the one or more brakes to couple the output shaft of the transmission to the case of the transmission.

13. The vehicle hill hold system of claim 10, where the torque output of the electric machine is adjusted based on a friction coefficient of a brake included in the one or more brakes and a pressure of fluid supplied to the one or more brakes.

14. The vehicle hill hold system of claim 10, further comprising additional instructions that cause the controller to reduce a pressure applied to the one or more brakes in response to a request to release a hill hold mode from being engaged.

15. The vehicle hill hold system of claim 10, where the torque output of the electric machine is adjusted to a torque that moves the vehicle in a forward direction when the one or more brakes are released and a driver demand pedal is not applied.

16. A method for releasing a vehicle from a hill hold mode, comprising:

via a controller, disengaging a transmission clutch to unlock an output shaft of a transmission from a transmission case in response to a request to exit the hill hold mode;

in response to detection of a slip of the vehicle motion restraining device, estimating an amount of torque output via an electric machine based on a current pressure of the transmission clutch and a friction coefficient of the transmission clutch; and adjusting the electric machine to produce the estimated amount of torque output.

17. The method of claim 16, where adjusting the amount of torque output includes adjusting the torque output to a constant value.

18. The method of claim 17, where the constant value is based on output of an inclinometer.

19. The method of claim 16, further comprising operating the vehicle in a speed control mode in response to slip of the transmission clutch.

20. The method of claim 16, where the transmission clutch is one of two transmission clutches capable of unlocking the output shaft of the transmission.

* * * * *